US010077396B2

(12) United States Patent
Nguyen et al.

(10) Patent No.: US 10,077,396 B2
(45) Date of Patent: *Sep. 18, 2018

(54) RETICULATED MATERIALS FOR THE FORMATION OF PROPPANT-FREE CHANNELS

(71) Applicant: Halliburton Energy Services, Inc., Houston, TX (US)

(72) Inventors: Philip D. Nguyen, Houston, TX (US); James William Ogle, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/328,979

(22) PCT Filed: Aug. 29, 2014

(86) PCT No.: PCT/US2014/053416
§ 371 (c)(1),
(2) Date: Jan. 25, 2017

(87) PCT Pub. No.: WO2016/032513
PCT Pub. Date: Mar. 3, 2016

(65) Prior Publication Data
US 2017/0210974 A1 Jul. 27, 2017

(51) Int. Cl.
*E21B 43/267* (2006.01)
*C09K 8/62* (2006.01)
(Continued)

(52) U.S. Cl.
CPC ............... *C09K 8/62* (2013.01); *C09K 8/80* (2013.01); *E21B 43/26* (2013.01); *E21B 43/267* (2013.01)

(58) Field of Classification Search
None
See application file for complete search history.

(56) References Cited

U.S. PATENT DOCUMENTS

| 5,833,000 A | 11/1998 | Weaver et al. |
| 7,044,220 B2 | 5/2006 | Nguyen et al. |

(Continued)

OTHER PUBLICATIONS

International Preliminary Report on Patentability issued in related Application No. PCT/US2014/053416, dated Mar. 9, 2017 (12 pages).

(Continued)

*Primary Examiner* — Angela M DiTrani
*Assistant Examiner* — Andrew Sue-Ako
(74) *Attorney, Agent, or Firm* — Craig Roddy; Baker Botts L.L.P.

(57) ABSTRACT

Compositions and methods for use for hydraulic fracturing and creating high porosity propped fractures in portions of subterranean formations are provided. In one embodiment, the methods include introducing a fracturing fluid into the well bore at or above a pressure to create or enhance at least one fracture in the subterranean formation; providing a carrier fluid including reticulated materials, wherein the carrier fluid is substantially proppant free; providing a proppant slurry; and introducing the carrier fluid and the proppant slurry into the at least one fracture to form a plurality of proppant aggregates.

19 Claims, 6 Drawing Sheets

(a)

(b)

(c)

(51) Int. Cl.
*C09K 8/80* (2006.01)
*E21B 43/26* (2006.01)

(56) References Cited

U.S. PATENT DOCUMENTS

| | | |
|---|---|---|
| 7,267,170 B2 | 9/2007 | Mang et al. |
| 7,281,581 B2 | 10/2007 | Nguyen et al. |
| 7,325,608 B2 | 2/2008 | van Batenburg et al. |
| 7,581,590 B2 | 9/2009 | Lesko et al. |
| 7,972,669 B2 | 7/2011 | Matsuoka et al. |
| 8,268,901 B2 | 9/2012 | Britton et al. |
| 8,636,065 B2 | 1/2014 | Lesko et al. |
| 2004/0206499 A1 | 10/2004 | Nguyen et al. |
| 2006/0048938 A1* | 3/2006 | Kalman ............... C09K 8/80 166/278 |
| 2006/0175058 A1 | 8/2006 | Nguyen |
| 2009/0044945 A1* | 2/2009 | Willberg ............... C09K 8/706 166/308.1 |
| 2010/0256777 A1 | 10/2010 | Datta et al. |
| 2011/0083849 A1 | 4/2011 | Medvedev et al. |
| 2014/0076559 A1 | 3/2014 | Ogle et al. |
| 2016/0319184 A1* | 11/2016 | Nguyen ............... C09K 8/62 |

OTHER PUBLICATIONS

International Search Report and Written Opinion issued in related PCT Application No. PCT/US2014/053416 dated May 8, 2015, 16 pages.

* cited by examiner

RETICULATED MATERIALS FOR THE FORMATION OF PROPPANT-FREE CHANNELS

CROSS-REFERENCE TO RELATED APPLICATION

The present application is a U.S. National Stage Application of International Application No. PCT/US2014/053416 filed Aug. 29, 2014, which is incorporated herein by reference in its entirety for all purposes.

BACKGROUND

The present disclosure relates to compositions and methods for use in subterranean operations, and more specifically, compositions and methods for hydraulic fracturing and creating high porosity propped fractures in portions of subterranean formations.

Subterranean wells (such as hydrocarbon producing wells, water producing wells, and injection wells) are often stimulated by hydraulic fracturing treatments. In hydraulic fracturing treatments, a fracturing fluid is pumped into a portion of a subterranean formation at a rate and pressure such that the subterranean formation breaks down and one or more fractures are formed. Typically, particulate solids, such as graded sand, are suspended in a portion of the fracturing fluid and then deposited in the fractures. These particulate solids, or "proppant particulates," serve to prevent the fractures from fully closing once the hydraulic fracturing pressure is released. By keeping the fracture from fully closing, the proppant particulates aid in forming conductive paths through which fluids may flow.

The proppant particulates used to prevent fractures from fully closing generally are particulate solids, such as sand, bauxite, ceramics, or nut hulls, which are deposited into fractures using traditional high proppant loading techniques. The proppant particulates and loading techniques suffer from an assortment of drawbacks that can limit the production potential of the well. The degree of success of a fracturing operation depends, at least in part, upon the resultant fracture porosity and conductivity once the fracturing operation is stopped and production is begun. Traditional fracturing operations place a large volume of proppant particulates into a fracture, and the porosity of the resultant packed, propped fracture is then at least partially related to the interconnected interstitial spaces between the abutting proppant particulates.

Certain fracturing operation involves placing a much reduced volume of proppant in a fracture to create a high porosity fracture. As referred to herein, a "high porosity fracture" refers to a fracture that exhibits a porosity of greater than about 40%, after the fracture has closed or applied a substantial mechanical stress. In such operations, the proppant particulates within the fracture may be widely spaced but they are still sufficient to hold the fracture open and allow for production. Such operations allow for increased fracture conductivity due, at least in part, to the fact that the produced fluids may flow around widely spaced proppant particulates rather than just through the relatively small interstitial spaces in a packed proppant bed. Thus, the effective placement and retention of proppant particulates within a fracture is often crucial to maintaining fluid flow in the stimulated region of the formation.

BRIEF DESCRIPTION OF THE FIGURES

These drawings illustrate certain aspects of some of the embodiments of the present disclosure, and should not be used to limit or define the disclosure.

FIGS. 3A, B, and C are photographs illustrating one example of the reticulated materials that may be used in accordance with certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions and methods for use in subterranean operations, and more specifically, compositions and methods for hydraulic fracturing and creating high porosity propped fractures containing proppant aggregates in portions of subterranean formations.

One obstacle in the placement of proppant within fracture(s) is the control of their positioning to form separated proppant aggregates to allow for the formation of proppant-free channels between the aggregates. Often as a result of gravity settling, proppant aggregates may not remain separated. In instances where separation between proppant aggregates is not maintained, the proppant aggregates may fuse together, thereby forming a large proppant mass that may limit the conductivity of the fracture for production.

Figure 3:
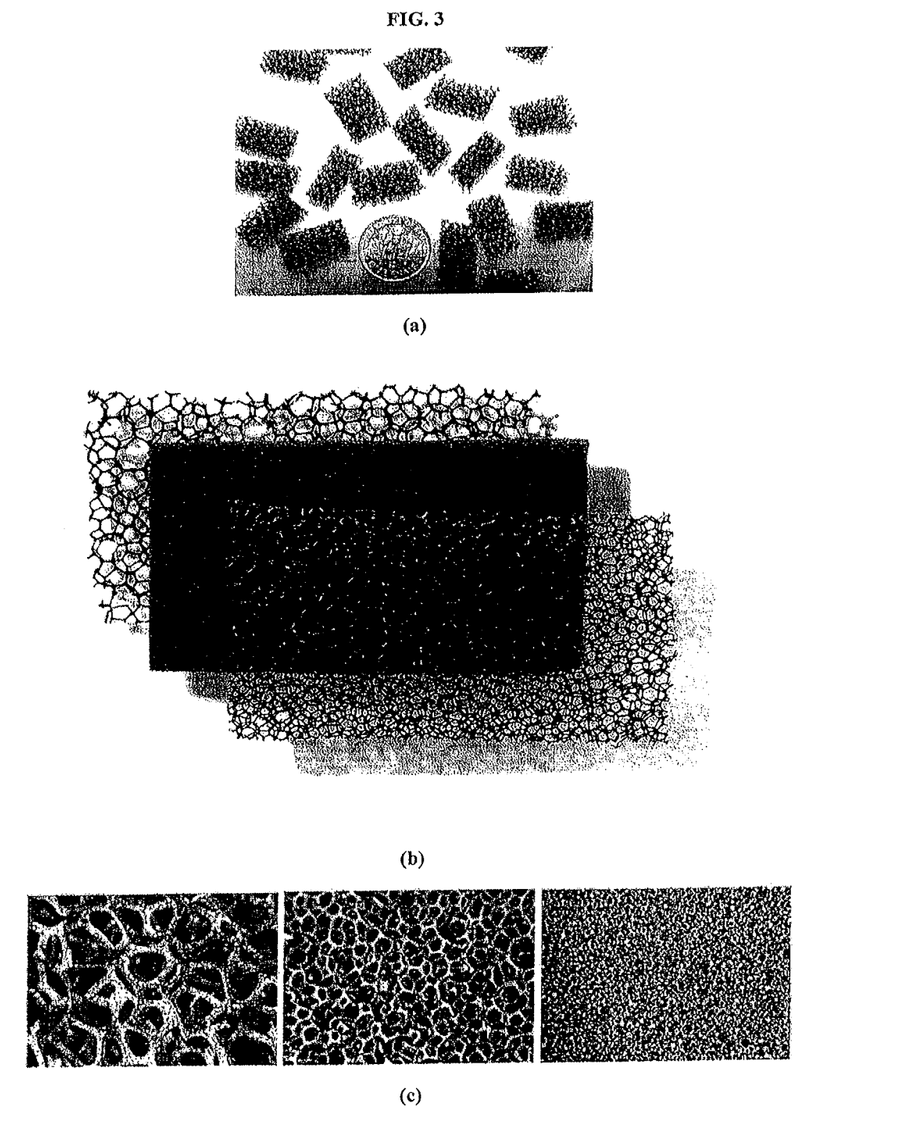
Figure 4:
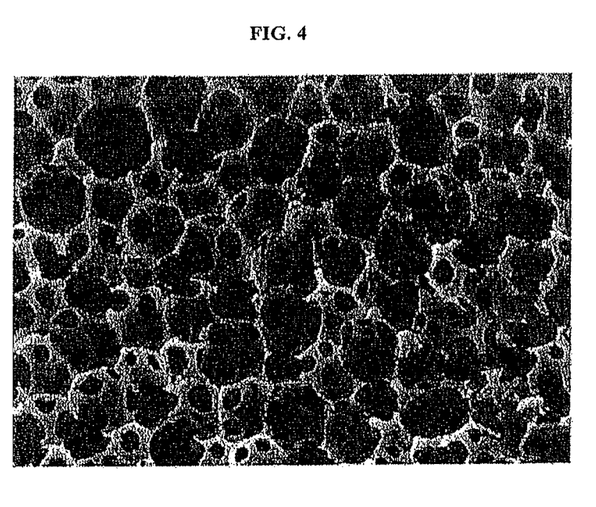
FIG. 4 is a photograph illustrating a close up view of the reticulated material that may be used in accordance with certain embodiments of the present disclosure.

The present disclosure provides methods and compositions for forming proppant-free channels between proppant aggregates within one or more fractures by utilizing reticulated materials. As used herein, the term "aggregate(s)" refers to a coherent body, such that when the aggregate is placed into the fracture(s) or into a carrier fluid, the aggregate should not become dispersed into smaller bodies without application of shear. The reticulated materials of the present disclosure possess a pre-formed, open cell, three-dimensional structure of skeletal strands with high porosity and permeability. Examples of the structure of reticulated materials that may be useful in accordance with the present disclosure are shown in FIGS. 3A, 3B, and 3C. FIG. 4 shows a close up view of one example of the structure of the reticulated materials that may be useful in accordance with the present disclosure. As shown in FIGS. 3 and 4, the reticulated materials of the present disclosure have pre-formed, open cell, three-dimensional structures. In certain embodiments, the reticulated materials that may be useful in accordance with the present disclosure are also deformable, such that the reticulated materials may deform and compress as they enter a perforation or fracture and may traverse the perforation or fracture without causing bridging. In certain embodiments, the reticulated materials are also resilient and flexible such that they can be compressed without permanent deformation of the reticulated materials. In certain embodiments, the reticulated materials may function as fillers to maintain separation of the plurality of proppant aggregates within fracture(s).

The reticulated materials that may be useful in accordance with the present disclosure may be formed of materials that are able to withstand the temperatures and pressures commonly found in downhole environments. The reticulated materials may be manufactured from various materials including, but not limited to, degradable polymers, non-degradable polymers, metals, and combinations thereof.

Examples of degradable polymers that may be used to prepare reticulated materials in accordance with the present disclosure include, but are not limited to, poly(lactic acid); polyhydroxyalkanoate, polyglycolic acid, polyol, poly(ortho ester); polybutylene succinate; polybutylene succinate-co-adipate; polyhydroxybutyrate-valerate; polyhydroxybutyrate-covalerate; polycaprolactone; polyester amide; starch-based polymer; polyvinyl alcohol; an aliphatic aromatic copolyester; and any combinations thereof. Examples of non-degradable polymers that may be useful in accordance with the present disclosure include, but are not limited to, polyamides, polyethylene, rayon, nylon, lexan, dextran, and combinations thereof. In certain embodiments, a metal/polymer composite may be useful in accordance with the present disclosure. For example, reticulated materials may provide a scaffold to allow for a metal to be deposited, for example, vapor deposited, onto reticulated materials. In another example, an aqueous suspension of ceramic nanoparticles may be coated onto reticulated materials. It is important to recognize that when such metals or ceramic nanoparticles are deposited and/or coated onto the reticulated materials, the amount of metal and/or ceramic nanoparticles deposited or coated onto the reticulated materials should be in an amount that does not significantly affect the ability of the reticulated materials to deform.

The reticulated materials should have a pore size and density sufficient to prevent bridging. The reticulated materials may be of varying pore sizes, as shown in FIG. 3. The reticulated materials preferably have a pore density in the range of from about 5 to about 80 pores per linear inch (ppi). In certain embodiments, the reticulated materials preferably have a pore density in the range of from about 10 to about 50 pores per linear inch (ppi). In certain embodiments, the pore density may be about 20 pores per linear inch. The pore size of the reticulated materials should be sufficiently small to prevent proppant aggregates from blocking or collecting within the pores of the reticulated materials, but sufficiently large enough to allow for the flow of hydrocarbons, without substantial inhibition, upon production from the wellbore.

Reticulated materials are often commercially available in the form of large sheets. For the purposes of the present disclosure, if a large sheet of reticulated material is used, it is typically made into smaller pieces prior to being used in subterranean applications. In certain embodiments, the pieces may have lengths no longer than about 0.5 inch, widths no more than about 0.25 inch, and thicknesses no more than about 0.25 inch. The reticulated materials utilized in accordance with the present disclosure do not need to be of uniform dimensions.

The reticulated materials may be introduced into a well bore using a carrier fluid. The amount of reticulated material present in the carrier fluid may be any amount that does not cause bridging upon placement of the carrier fluid into a fracture. In some embodiments the reticulated materials are present in the carrier fluid in an amount in the range of from about 5% to about 75% by volume of the carrier fluid. In other embodiments the reticulated materials are present in the treatment fluid in an amount in the range of from about 5% to about 60% by volume of carrier fluid. In other embodiments the reticulated materials are present in an amount in the range of from about 5% to about 10% by volume of the carrier fluid, in other embodiments, 10% to 15%, in other embodiments, 15% to 20%, in other embodiments, 20% to 25%, in other embodiments, 25% to 30% in other embodiments, 30% to 35%, in other embodiments, 35% to 40%, in other embodiments, 40% to 45%, in other embodiments, 45% to 50%, in other embodiments, 50% to 55%, in other embodiments, 55% to 60% by volume of carrier fluid, in other embodiments, 60% to 65% by volume of carrier fluid; in other embodiments, 65% to 70%, in other embodiments, 70% to 75%, by volume of carrier fluid.

Any carrier fluid suitable for fracturing applications may be used in accordance with the present disclosure to introduce reticulated materials into a well bore. Such carrier fluids include but are not limited to, aqueous gels, viscoelastic surfactant gels, oil gels, heavy brines, and emulsions. The carrier fluid may also be foamed. Foams can be created, for example, by the addition of a foaming agent, or a gas, such as carbon dioxide or nitrogen to the carrier fluid.

Suitable aqueous gels are generally comprised of water and one or more gelling agents. Suitable emulsions can be comprised of two immiscible liquids such as an aqueous liquid or gelled liquid and a hydrocarbon. In certain embodiments of the present disclosure, the carrier fluid is an aqueous gel comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, carrier fluid, inter alia, reduces fluid loss and allows the carrier fluid to transport significant quantities of reticulated materials. The water used to form the carrier fluid may be salt water, brine, or any other aqueous liquid that does not adversely react with the other components or reticulated materials. The density of the carrier fluid can be increased to provide additional transport of reticulated materials in the carrier fluid.

A variety of gelling agents may be used, including hydratable polymers that contain one or more functional groups such as hydroxyl, carboxyl, sulfate, sulfonate, amino, or amide groups. Suitable gelling agents typically comprise polymers, synthetic polymers, or a combination thereof. A variety of gelling agents can be used in conjunction with the methods and compositions of the present disclosure, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the carrier fluid in an amount in the range of from about 0.1% to about 5% by weight of the water therein. In certain embodiments, the gelling agents are present in the carrier fluid in an amount in the range of from about 0.01% to about 2% by weight of the water therein.

Crosslinking agents may be used to crosslink gelling agent molecules to form crosslinked gelling agents. Crosslinkers typically comprise at least one ion that is capable of crosslinking at least two gelling agent molecules. Examples of suitable crosslinkers include, but are not limited to, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinker is "CL-39" available from Halliburton Energy Services, Inc., Duncan Okla. Suitable crosslinkers generally are present in the viscosified carrier fluid of the present disclosure in an amount sufficient to provide, inter alia, the desired degree of crosslinking between gelling agent molecules. In certain embodiments, the crosslinkers may be present in an amount in the range from about 0.001% to about 10% by weight of the water in the carrier fluid. In certain embodiments, the crosslinkers may be present in the carrier fluid in an amount in the range from about 0.01% to about 1% by weight of the water therein. Individuals skilled in the art, with the benefit of this disclosure, will recognize the exact type and amount of crosslinker to use in the carrier fluid depending on factors such as the specific gelling agent, desired viscosity, and formation conditions.

The gelled or gelled and cross-linked carrier fluids may also include internal delayed gel breakers such as enzyme, oxidizing, acid buffer, or temperature-activated gel breakers. The gel breakers cause the viscous carrier fluids to revert to thin fluids that can be produced back to the surface. The gel breaker used is typically present in the carrier fluid in an amount in the range of from about 0.5% to about 10% by weight of the gelling agent.

The carrier fluids used in accordance with the present disclosure may also include one or more of a variety of well-known additives, such as gel stabilizers, fluid loss control additives, clay stabilizers, bactericides, and the like. The carrier fluid also may include other degradable solids, including but not limited to, salts, polysaccharides, wax, calcium carbonate, benzoic acid, naphthalene based materials, magnesium oxide, sodium bicarbonate, soluble resins, polylactic acids, and combinations thereof. Though the carrier fluid may contain such well-known additives, the carrier fluid including reticulated materials is generally "substantially proppant free" which means substantially free of proppant particulates or proppant aggregates such that the reticulated materials are able to be compressed and decompressed and maintain their open cell structure within the carrier fluid. Nevertheless, such "substantially proppant free" carrier fluid may comprise proppant particulates or proppant aggregates in insubstantial quantities.

In certain embodiments, the reticulated materials may be pre-mixed with a base fluid and stored in compressed form as liquid concentrates. The liquid concentrates may optionally include a surfactant. In certain embodiments, the base fluid of the liquid concentrate containing reticulated materials may be a paraffinic solvent, salt water, brine, an aqueous gel, or any other aqueous liquid that does not adversely react with the reticulated materials or other components of the liquid concentrates. The amount of reticulated materials in the base fluid may depend upon the bulk density of the reticulated materials. In certain embodiments, the reticulated materials may be present in the base fluid in an amount in the range of from about 1 to about 15 pounds per gallon of base fluid. In certain embodiments, the reticulated materials may be present in the base fluid in an amount in the range of from about 10 pounds to 15 pounds per gallon of base fluid. Prior to introduction into a fracture, the liquid concentrates may be blended with a carrier fluid allowing for the reticulated materials present in the liquid concentrate to expand from their compressed form and resume their original structure. This may occur at or near the well bore. In other embodiments, the compressed reticulated materials of the liquid concentrates may be blended with a carrier fluid and exposed to high shear rates during injection into fracture(s). Due to the exposure to high shear rates, the reticulated materials in a compressed state will gradually expand and return to their original structures within the fracture(s), and ultimately will fill the voids between proppant aggregates within the fracture(s).

In one embodiment, the present disclosure provides a method of fracturing a subterranean formation penetrated by a well bore, the method comprising introducing a fracturing fluid into the well bore at or above a pressure sufficient to create or enhance at least one fracture in the subterranean formation; introducing a carrier fluid comprising reticulated materials into the at least one fracture; forming a plurality of proppant aggregates, each proppant aggregate comprising a binding fluid and proppant; and introducing the plurality of proppant aggregates into the at least one fracture. As used herein, the term "binding fluid" refers to a fluid that confines the proppant aggregate, such that when the proppant aggregate is placed into a fracture or placed into a carrier fluid, the proppant aggregate remains a coherent body that does not generally become dispersed into smaller bodies without application of shear.

Generally, the plurality of proppant aggregates are introduced into the fracture(s) intermittently with or proximate to the introduction of a carrier fluid including reticulated materials into the fracture(s). Introduction of the proppant aggregates and the reticulated materials into the fracture(s) should be continued until a desired fracturing treatment design is achieved. The fracturing treatment design should be similar to conventional hydraulic fracturing treatments. In certain embodiments, that fracturing treatment design may involve a carrier fluid including reticulated materials being pumped continuously into one or more fractures, while proppant aggregates are introduced into one or more fractures intermittently during pumping. The carrier fluids used to introduce the proppant aggregates and the reticulated materials into one or more fractures could be the same carrier fluid, or could be different carrier fluids.

Due to their placement into the fracture(s) in conjunction with or proximate to the reticulated materials, the proppant aggregates should be distributed throughout the fracture(s), wherein the spaces between each proppant aggregate contain the reticulated materials. The carrier fluid including the reticulated materials serves to fill the spaces between each of the proppant aggregates to prevent the proppant aggregates from merging together. After a desired period of time (e.g., a shut-in period), at least a portion of the carrier fluids carrying the proppant aggregates and the reticulated materials should be recovered from the fracture(s), for example, by producing the carrier fluids out of the well bore during flow back cleanup or by recovering the carrier fluid during or prior to production of the well bore. The plurality of proppant aggregates should have sufficient viscosity and/or have cured into a plurality of hardened masses (e.g., hardened proppant aggregates) so that at least a substantial portion of the plurality of proppant aggregates are not recovered from the fracture(s) during flow back cleanup, before or during production of the well. However, it is recognized that, in some instances, a small portion of the plurality of proppant aggregates may be recovered. Recovery of the carrier fluid from the fracture(s) should result in voids surrounding the plurality of proppant aggregates distributed throughout the fracture(s), wherein the voids provide flow paths through which produced hydrocarbons can flow. It is also recognized that, in some instances, a portion of reticulated materials may remain in the fracture after recovery of the carrier fluid. Because of the formed, open cell, three-dimensional structure of the reticulated materials, the presence of the reticulated materials within the voids surrounding the plurality of proppant aggregates should not significantly affect the conductivity of the fracture(s), and the fracture(s) may still be of high porosity.

Certain methods of the present disclosure comprise forming a plurality of proppant aggregates. It is believed that the plurality of proppant aggregates may be any of a variety of shapes, including ovals, spheroids, stringy masses with irregular shapes and sizes, combinations thereof, and the like. As those of ordinary skill in the art will appreciate, the proppant aggregates may have a well-defined physical shape or may have an irregular geometry. In some embodiments, it may be desirable for each proppant aggregate to be substantially the same size.

A variety of methodologies may be used to form the plurality of proppant aggregates and introduce them into the fracture(s). In one example, to form the plurality of proppant aggregates, a proppant slurry should be provided. Because the proppant slurry is used to form the proppant aggregates, the proppant aggregates will have substantially the same composition as the proppant slurry, namely both the proppant aggregates and the proppant slurry generally comprise a binding fluid and proppant. A carrier fluid comprising reticulated materials also may be provided.

In one embodiment, predetermined volumes of the proppant slurry may be pumped intermittently into the well bore so that a plurality of proppant aggregates may be introduced into the one or more fractures. In these embodiments, the proppant slurry may be alternately pumped into the well bore with carrier fluid comprising reticulated materials. For example, a first portion of the carrier fluid comprising reticulated material may be introduced into the well bore. After introduction of the first portion, a predetermined volume of the proppant slurry may be introduced into the well bore. One of ordinary skill in the art, with the benefit of this disclosure, will recognize the volume of the proppant slurry to be used, which may be dependent upon, for example, the dimensions of the fracture(s). Once the predetermined volume of the proppant slurry has been introduced into the well bore, a second portion of the carrier fluid comprising reticulated materials may be introduced into the well bore, thereby forming a proppant aggregate in the well bore, the proppant aggregate spaced between the first and second portions of carrier fluid. These steps may be repeated until the desired amount of proppant aggregates have been formed and introduced into the fracture(s). The predetermined volumes of the proppant slurry that are being alternately pumped may remain constant or may be varied, such that the plurality of proppant aggregates introduced into the fracture(s) are of varying sizes and shapes.

In another embodiment, the proppant slurry is combined with the carrier fluid comprising reticulated materials so that the proppant slurry forms a plurality of proppant aggregates in the carrier fluid comprising reticulated material. Among other things, in these embodiments, the plurality of proppant aggregates should be suspended in the carrier fluid, carried by the carrier fluid into the fracture(s), and distributed within the fracture(s). In such embodiments, at least a portion of the proppant aggregates may be deposited within the fracture(s). Generally, in these embodiments, the proppant slurry should be combined with the carrier fluid prior to introducing the carrier fluid into the well bore. Where the proppant slurry contains a curable resin composition (as will be discussed further below), the proppant slurry is preferably combined with the carrier fluid downstream of the blending and/or pumping equipment, among other things, to reduce coating of the curable resin composition onto such equipment and to minimize the interaction of the proppant slurry and the carrier fluid comprising reticulated material.

In one embodiment, the plurality of proppant aggregates are formed by shearing (or cutting) the proppant slurry as it is combined with the carrier fluid, e.g., as it is pumped and extruded from a container into a different container that contains the carrier fluid including reticulated materials. In certain embodiments where the proppant slurry is combined with the carrier fluid, predetermined volumes of the proppant slurry are intermittently injected into the carrier fluid including reticulated materials that is being introduced into the well bore. The predetermined volumes of the proppant slurry that are being intermittently injected into the carrier fluid including reticulated materials may remain constant or may be varied, such that the proppant aggregates form in the carrier fluid in varying sizes and shapes. In some embodiments, each predetermined volume of the proppant slurry may be in the range of from about 0.01 gallon to about 5 gallons. However, one of ordinary skill in the art, with the benefit of this disclosure, will recognize that larger volumes of the proppant slurry may be used, dependent upon, for example, the dimensions of the fracture(s).

In another embodiment, formation of the plurality of proppant aggregates comprises simultaneously introducing the carrier fluid comprising reticulated materials and the proppant slurry into the fracture(s). In these embodiments, the carrier fluid comprising reticulated material and the proppant slurry may be introduced into the fracture(s) via separate flow paths, so at to form a plurality of proppant aggregates. For example, one of the fluids (e.g., the carrier fluid or the proppant slurry) may be introduced into the fracture(s) via a conduit (e.g., coiled tubing or jointed pipe) that is disposed within the well bore, while the other fluid (e.g., the carrier fluid or the proppant slurry) may be introduced into the fracture(s) via an annulus defined between the tubing and the casing. As the proppant slurry and the carrier fluid are cointroduced into the fracture(s), the plurality of proppant aggregates should form and be distributed within the fracture(s). Among other things, this may minimize interaction between the carrier fluid and the plurality of proppant aggregates and also may enhance the formation of layers between the two fluids. One of ordinary skill, with the benefit of this disclosure, will recognize suitable methods for forming the proppant aggregates and introducing them into the fracture(s), dependent upon the particular application.

Figure 5:
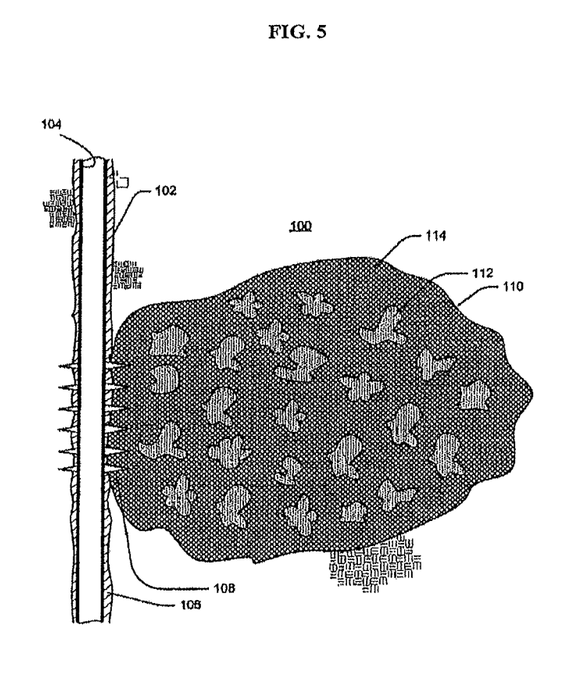
FIG. 5 is a schematic diagram of a fracture that includes a plurality of proppant aggregates before recovery of a carrier fluid in accordance with an embodiment of the present disclosure.

In accordance with the above described steps, the plurality of proppant aggregates should be introduced into the fracture(s) so that the proppant aggregates are distributed through the length and height of the fracture(s) without packing or stacking together. The proppant aggregates may be randomly distributed throughout the length and height of the fracture(s), or they may be evenly distributed. The space between the proppant aggregates will be occupied by the carrier fluid including reticulated materials. Due to the presence of the carrier fluid including reticulated materials in the space between the proppant aggregates within the fracture, the potential for forming a full monolayer or a packed portion in the fracture is greatly reduced. FIG. 5 depicts a plurality of proppant aggregates 112 distributed throughout fracture 110 in a partial monolayer arrangement. In the space between the proppant aggregates is carrier fluid 114, which includes reticulated materials. Because of the nature of the reticulated materials, if the carrier fluid is a crosslinked gel that breaks prematurely, the proppant aggregates may nevertheless remain separated due to the presence of reticulated materials in the carrier fluid that provide and enhance separation between proppant aggregates.

Generally, the ratio of the plurality of proppant aggregates to carrier fluid introduced into the fracture(s) will vary, depending on the compositions of the proppant aggregates and the carrier fluid, the closure stress applied on the proppant aggregates, formation characteristics and conditions, the desired conductivity of the fracture, the amount of the carrier fluid that can be removed from the fracture(s), and other factors known to those of ordinary skill in the art. As will be understood by those of ordinary skill in the art, with the benefit of this disclosure, the higher the ratio of the plurality of proppant aggregates to carrier fluid introduced into the fracture(s), the less void channels or less conductive fractures will result.

According to the methods of the present disclosure, after placement of the proppant slurry and reticulated materials into the fracture(s), the well bore may be shut in for a period of time. The necessary period of time for the shut-in period is dependent, among other things, on the composition of the proppant aggregates used and the temperature of the formation. Generally, the chosen period of time may be up from a few hours to about 72 hours, or longer, depending on the composition used in preparing the proppant slurry. Determining the proper period of time to shut in the formation is within the ability of one skilled in the art, with the benefit of this disclosure. For example, in some embodiments, the shut-in period may be sufficient to allow the carrier fluid to break so that the carrier fluid may be recovered from the well, for example, during well cleanup flow back and/or during production of the well. In certain embodiments, the carrier fluids including proppant aggregates and including reticulated materials are crosslinked gels. In those embodiments, it is preferred that the breaking of crosslinked gel including reticulated materials occurs after the breaking of the crosslinked gel including proppant aggregates, and after the closure of the fracture, to ensure the agglomeration and curing of proppant grains to form proppant aggregates, and that the proppant aggregates remain separated from one another. In certain embodiments, the carrier fluid of proppant slurry may be a linear gel, and the carrier fluid including reticulated materials may be a crosslinked gel.

In another embodiment, where the binding fluid contained in the proppant aggregates comprises a curable resin composition, the shut-in period may be sufficient to allow each proppant aggregate slurry to cure into a hardened mass (e.g., a hardened proppant aggregate) capable of preventing the fracture(s) from fully closing. In some embodiments, a portion of the proppant aggregates introduced into the at least one fracture are cured. In another embodiment, substantially all of the proppant introduced into the at least one fracture are cured. In yet another embodiment, all of the proppant introduced into the at least one fracture are cured. Generally, in these embodiments, the proppant aggregates should cure to form multiple hardened masses within the fracture(s). To provide maximum fracture conductivity, at least a substantial portion (and preferably substantially all) of the proppant aggregates should not agglomerate within the fracture(s), but should instead be distributed throughout the fracture(s). The carrier fluid comprising reticulated materials occupies the space between the proppant aggregates to prevent agglomeration within the fracture(s), and to allow for a better distribution of proppant aggregates throughout the fracture(s).

Among other things, once placed within the fracture(s) and/or after a desired shut-in period, the plurality of proppant aggregates should act as proppant particulates that prevent the fracture(s) from fully closing, while providing for conductive channels through which produced hydrocarbons may be produced. Accordingly, the plurality of proppant aggregates should not merge together within the fracture(s) or flow back when the well is placed into production. Depending on, among other things, the ratio of the plurality of proppant aggregates to the carrier fluid comprising reticulated materials placed into the fracture(s), the compositions of the proppant aggregates and the carrier fluid comprising reticulated material, the closure stress applied on the proppant aggregates, the use of the proppant aggregates to prop the fracture(s) in conjunction with a carrier fluid including reticulated materials may provide for a higher porosity fracture than can be achieved using conventional packed proppant beds or proppant aggregates in the absence of a carrier fluid including reticulated materials. For example, it is believed that the methods of the present disclosure may be used to facilitate the formation of propped fractures having a porosity greater than about 40% while maintaining enough conductive channels for production and maintaining the separation within the fracture of proppant aggregates. Some embodiments of the present disclosure may be used to form high porosity propped fractures exhibiting a porosity of at least about 50%, which is derived from connective, proppant-free channels surrounding the proppant aggregates connecting the reservoir to the wellbore upon removal of the carrier fluid. Other embodiments of the present disclosure may be used to form high porosity propped fractures exhibiting a porosity of at least about 60%. Other embodiments of the present disclosure may be used to form high porosity propped fractures exhibiting a porosity of at least about 70%. Other embodiments of the present disclosure may be used to form high porosity propped fractures exhibiting a porosity of at least about 80%. Other embodiments of the present disclosure may be used to form high porosity propped fractures exhibiting a porosity of at least about 90%. Porosity values expressed herein are stressed porosities, that is, the porosity after the fracture has closed or applied a substantial mechanical stress.

Referring now to FIG. 5, certain embodiments of the present disclosure are illustrated after introduction of a plurality of proppant aggregates and a carrier fluid including reticulated materials into the fracture(s) in a subterranean formation. Subterranean formation 100 is shown penetrated by well bore 102. While FIG. 5 depict well bore 102 as a generally vertical well, the methods of the present disclosure also may be performed in generally horizontal, inclined, or otherwise formed portions of wells. In addition, well bore 102, may be a primary well bore having one or more branch well bores extending therefrom, or well bore 102 may be a branch well bore extending laterally from a primary well bore. Generally, well bore 102 should be lined with casing 104 that is cemented to subterranean formation 100 by cement sheath 106, inter alia, to maintain well bore integrity. Those of ordinary skill in the art will appreciate the circumstances when well bore 102 should or should not be cased and whether such casing should or should not be cemented. Indeed, the present disclosure does not lie in whether or not to case a well bore, or if so, how. One or more perforations 108 are shown that extend through casing 104 and cement sheath 106 into subterranean formation 100. The one or more perforations 108 in casing 104 and cement sheath 106 may be created using any suitable technique. Furthermore, a fracture in subterranean formation 100 is depicted in FIG. 5 as fracture 110 that extends in an essentially vertical plane that is approximately longitudinal or parallel to the axis of well bore 102. In addition, plurality of proppant aggregates 112 is shown distributed in fracture 110. As discussed above, plurality of proppant aggregates 112 may be formed in a variety of shapes, as depicted in FIG. 5. The spaces in fracture 110 between each of plurality of proppant aggregates 112 contain carrier fluid 114, which includes reticulated materials.

Figure 6:
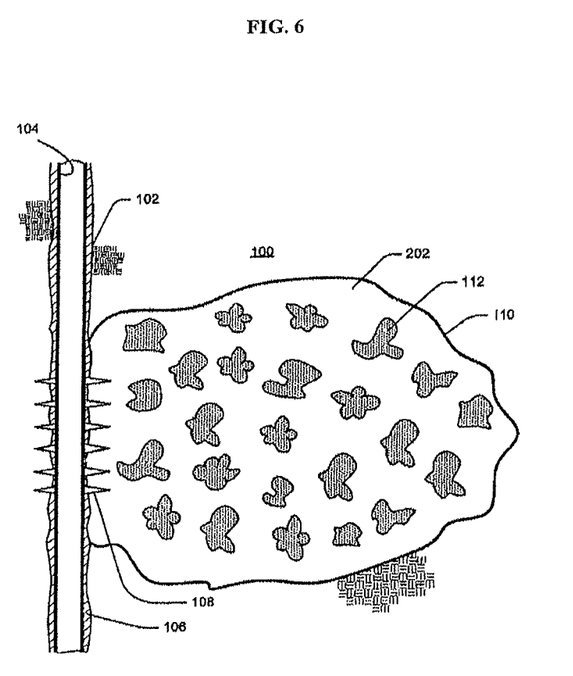
FIG. 6 is a schematic diagram of the fracture of FIG. 5 that includes a plurality proppant aggregates after recovery of a carrier fluid in accordance with one embodiment of the present disclosure.

After a desired period of time (e.g., a shut-in period), carrier fluid 114 comprising reticulated materials may be recovered from fracture 110. Referring now to FIG. 6, fracture 110 is depicted after carrier fluid 114 (shown in FIG. 5) has been recovered. Plurality of proppant aggregates 112 remains in fracture 110 after recovery of carrier fluid 114 therefrom. Prior to its recovery, carrier fluid 114, including the reticulated materials, filled the voids 202 in the spaces between the plurality of proppant aggregates to prevent the separate proppant aggregates 112 from merging together within the fracture and ensure the proper distribution and placement of proppant aggregates within fracture 110. Prevention of the agglomeration of proppant aggregates within the fracture(s) enhances conductivity of the fracture(s) when the carrier fluid is removed. Due to the recovery of carrier fluid 114, voids 202 in the spaces between the plurality of proppant aggregates 112 provide flow paths for the production of hydrocarbons from subterranean formation 100 and proppant aggregate agglomeration may be minimized.

As discussed above, formation of the plurality of proppant aggregates generally comprises the provision of a proppant slurry, the proppant slurry comprising a binding fluid and a proppant. Additionally, in some embodiments, the proppant slurry may further comprise other additives such as degradable particles. Because the proppant slurry is used to form the proppant aggregates, the proppant aggregates will have substantially the same composition as the proppant slurry. The proppant slurry may be pre-made or prepared-on-the-fly. Depending on the type of binding fluid of the proppant slurry, the concentration of proppant within the binding fluid may vary. For example, when the binding fluid is an aqueous gel, the proppant slurry may contain proppant in an amount of about 30 pounds of proppant per gallon of binding fluid. In certain embodiments, the proppant concentration of the proppant slurry may be in the range of from about 22 pounds per gallon to about 24 pounds per gallon of binding fluid. In certain embodiments, when the binding fluid is a highly viscous or crosslinked gel, no breaker may be included in the binding fluid.

Any conventional proppant may be used to prepare the proppant aggregates in accordance with the present disclosure. Any suitable proppant particulates may be used, including sand (such as beach sand, desert sand, or graded sand), bauxite; ceramic materials; glass materials; polymer materials; Teflon® materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The proppant particulates are treated with a bridgeable agent. The bridgeable agents suitable for use in the present disclosure include for example, curable resins; interlocking proppant particulates; epoxy resins; furan resins; phenolic resins; furfuryl aldehyde resins; furfuryl alcohol resins; non-aqueous tackifying agents; aqueous tackifying agents; silyl modified polyamides; siloxanes; mixtures of epoxy silanes and amino-silanes, mixtures of polyethylenimine and epoxy silanes.

Binding fluids suitable for use in the present disclosure include curable resin compositions and aqueous gels. Generally, the binding fluid should be immiscible or at least partially immiscible with the carrier fluid including reticulated materials so that the proppant aggregates remain a coherent body when contacted by or combined with the carrier fluid. For example, in some embodiments, the proppant slurry may be used to form a plurality of proppant aggregates, which will be suspended in the carrier fluid. In these embodiments, the binding fluid should allow each of the proppant aggregates to remain a coherent body when suspended in the carrier fluid.

Curable resin compositions suitable for use as the binding fluids of the present disclosure generally comprise any suitable resin that is capable of forming a hardened, consolidated mass. Many such resins are commonly used in subterranean consolidation operations, and some suitable resins include two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present disclosure and to determine whether a catalyst is required to trigger curing.

Optionally, the curable resin composition further may contain a solvent. Any solvent that is compatible with the resin and achieves the desired viscosity effect is suitable for use in the present disclosure. The solvents that can be used in the present disclosure preferably include those having high flash points (most preferably above about 125° F.). Examples of solvents suitable for use in the present disclosure include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether and how much solvent is needed to achieve a suitable viscosity.

Suitable aqueous gels that may be used as binding fluid are generally comprised of water and one or more gelling agents. In certain embodiments of the present disclosure, the binding fluid is an aqueous gel comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, binding fluid, may allow the binding fluid to transport significant quantities of suspended proppant and allows the proppant slurry to remain a coherent mass. Furthermore, it is desired for the aqueous gel to maintain its viscosity after placement into the fracture(s) in the subterranean formation. Accordingly, the components of the aqueous gel should be selected so that, when exposed to downhole conditions (e.g., temperature, pH, etc.), it does not experience a breakdown or deterioration of the gel structure nor do the proppant aggregates experience a breakdown or deterioration. Furthermore, no gel breakers should be included in the aqueous gel so that it does not break down and flow back, e.g., when the well is placed in production.

The water used to form the aqueous gel may be fresh water, saltwater, brine, or any other aqueous liquid that does not adversely react with the other components. The density of the water can be increased to provide additional particle transport and suspension in the present disclosure. The aqueous gels may also include one or more of a variety of well-known additives, such as gel stabilizers, fluid loss control additives, clay stabilizers, bactericides, and the like. A variety of gelling agents and cross-linking agents may also be used in the binding fluid. The compositions of the present disclosure may be prepared using any suitable method and/or equipment (e.g., blenders, mixers, stirrers, etc.) known in the art at any time prior to their use. The compositions may be prepared at a well site or at an offsite location.

An embodiment of the present disclosure is a liquid concentrate composition comprising: a base fluid; and a reticulated material, wherein the reticulated material is in a compressed form and is present in the base fluid in the range of from about 1 to about 15 pounds per gallon of base fluid.

An embodiment of the present disclosure is a method comprising: introducing a fracturing fluid into a well bore at or above a pressure sufficient to create or enhance at least one fracture in a subterranean formation; providing a carrier fluid comprising reticulated materials, wherein the carrier fluid is substantially proppant free; providing a proppant slurry; and introducing the carrier fluid and the proppant slurry into the at least one fracture to form a plurality of proppant aggregates.

Another embodiment of the present disclosure is a method comprising: introducing a fracturing fluid comprising a plurality of proppant aggregates into a well bore at or above a pressure sufficient to create or enhance at least one fracture in a subterranean formation; providing a carrier fluid comprising reticulated materials, wherein the carrier fluid is substantially proppant free; introducing the carrier fluid into the at least one fracture; and injecting a plurality of predetermined volumes of proppant slurry into the carrier fluid as the carrier fluid is introduced into the well bore to form a plurality of proppant aggregates.

Another embodiment of the present disclosure is a method comprising: introducing a fracturing fluid into a well bore at or above a pressure to create or enhance at least one fracture in a subterranean formation; providing a carrier fluid comprising reticulated materials, wherein the carrier fluid is substantially proppant free; introducing the carrier fluid into the at least one fracture; and introducing a proppant slurry into the at least one fracture to form a plurality of proppant aggregates, wherein the carrier fluid and the proppant slurry are simultaneously introduced into the at least one fracture via separate flow paths.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

Figure 1:
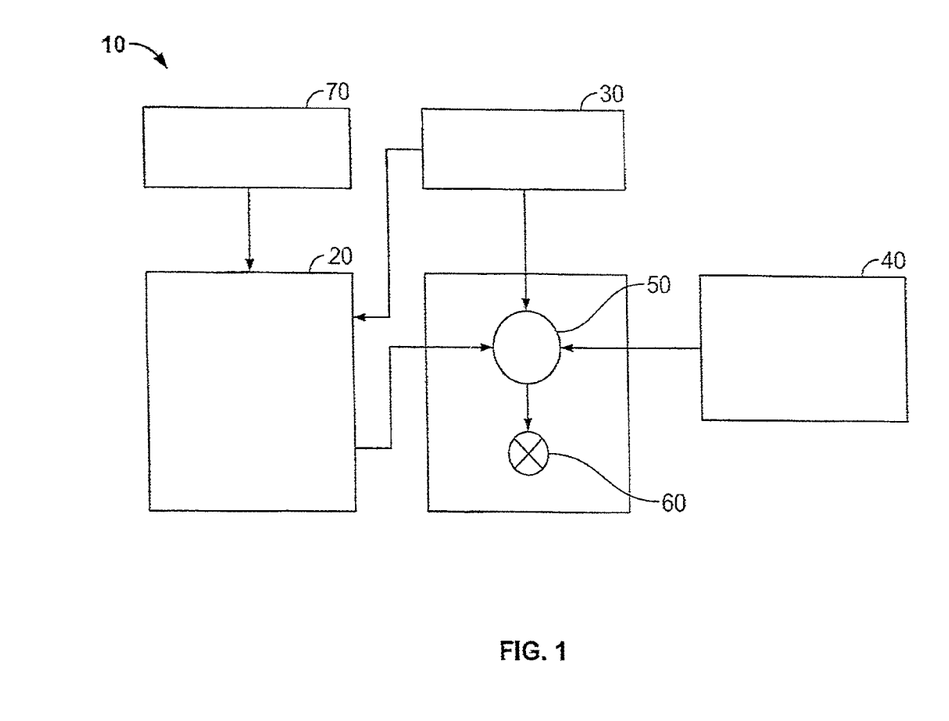
FIG. 1 is a diagram illustrating an example of a fracturing system that may be used in accordance with certain embodiments of the present disclosure.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
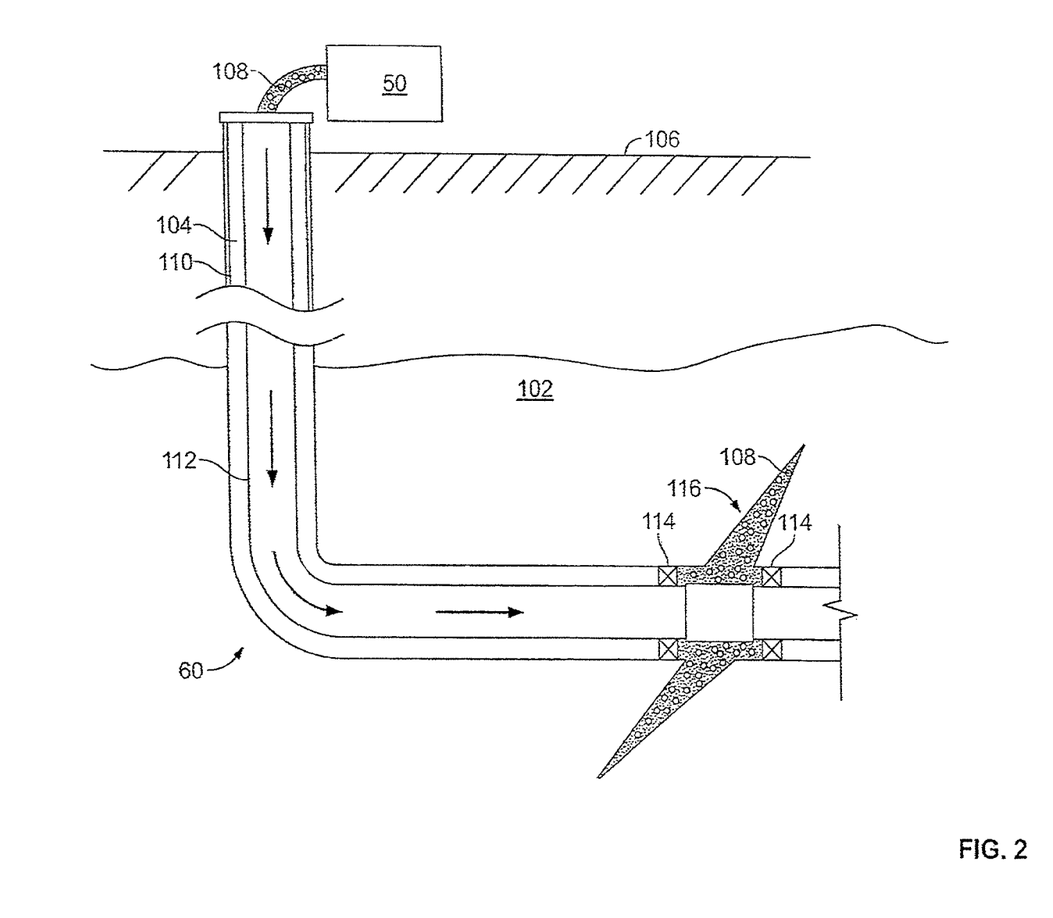
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   introducing a fracturing fluid into a well bore at or above a pressure sufficient to create or enhance at least one fracture in a subterranean formation;
   providing a carrier fluid comprising reticulated materials, wherein the reticulated materials comprise a degradable polymer comprising an open cell, three-dimensional structure having a pore size and density sufficient to prevent bridging, and the carrier fluid is substantially proppant free;
   providing a proppant slurry;
   introducing the carrier fluid and the proppant slurry into the at least one fracture to form a plurality of proppant aggregates; and
   recovering a portion of the carrier fluid from the well bore to form proppant-free channels between the plurality of proppant aggregates.

2. The method of claim 1 wherein at least a portion of the carrier fluid resides in at least one space between the plurality of proppant aggregates.

3. The method of claim 1, wherein introducing the carrier fluid and the proppant slurry into the at least one fracture comprises pumping intermittently the carrier fluid and the proppant slurry into the at least one fracture.

4. The method of claim 1, wherein introducing the carrier fluid and the proppant slurry into the at least one fracture comprises injecting a plurality of predetermined volumes of proppant slurry into the carrier fluid as the carrier fluid is introduced into the well bore.

5. The method of claim 1, wherein introducing the carrier fluid and the proppant slurry into the at least one fracture comprises introducing the carrier fluid and the proppant slurry into the at least one fracture via separate flow paths.

6. The method of claim 1, further comprising recovering the carrier fluid from the well bore to form channels in the space between proppant aggregates.

7. The method of claim 1, wherein the reticulated materials are present in the carrier fluid in the range of from about 5% to about 75% by volume of carrier fluid.

8. The method of claim 1, wherein the carrier fluid is selected from the group consisting of aqueous gels, viscoelastic surfactant gels, oil gels, heavy brines, and emulsions.

9. The method of claim 1, wherein the carrier fluid is prepared at or near the well bore.

10. The method of claim 1, wherein the proppant slurry is prepared at or near the well bore.

11. A method comprising:
    introducing a fracturing fluid comprising a plurality of proppant aggregates into a well bore at or above a pressure sufficient to create or enhance at least one fracture in a subterranean formation;
    providing a carrier fluid comprising reticulated materials, wherein the reticulated materials comprise a degradable polymer comprising an open cell, three-dimensional structure having a pore size and density sufficient to prevent bridging, and the carrier fluid is substantially proppant free;
    introducing the carrier fluid into the at least one fracture;
    injecting a plurality of predetermined volumes of proppant slurry into the carrier fluid as the carrier fluid is introduced into the well bore to form a plurality of proppant aggregates; and
    recovering a portion of the carrier fluid from the well bore to form proppant-free channels between the plurality of proppant aggregates.

12. The method of claim 11, wherein the reticulated materials are present in the carrier fluid in the range of from about 5% to about 75% by volume of carrier fluid.

13. The method of claim 11, wherein the carrier fluid is selected from the group consisting of aqueous gels, viscoelastic surfactant gels, oil gels, heavy brines, and emulsions.

14. The method of claim 11, wherein the carrier fluid is introduced into the at least one fracture using one or more pumps.

15. A method comprising:
    introducing a fracturing fluid into a well bore at or above a pressure to create or enhance at least one fracture in a subterranean formation;
    providing a carrier fluid comprising reticulated materials, wherein the reticulated materials comprise a degradable polymer comprising an open cell, three-dimensional structure having a pore size and density sufficient to prevent bridging, and the carrier fluid is substantially proppant free;
    introducing the carrier fluid into the at least one fracture;
    introducing a proppant slurry into the at least one fracture to form a plurality of proppant aggregates, wherein the carrier fluid and the proppant slurry are simultaneously introduced into the at least one fracture via separate flow paths; and
    recovering a portion of the carrier fluid from the well bore to form proppant-free channels between the plurality of proppant aggregates.

16. The method of claim 15, wherein the carrier fluid is prepared at or near the well bore.

17. The method of claim 15, wherein the proppant slurry is prepared at or near the well bore.

18. The method of claim 15, wherein the carrier fluid is selected from the group consisting of aqueous gels, viscoelastic surfactant gels, oil gels, heavy brines, and emulsions.

19. The method of claim 15, wherein the reticulated materials are present in the carrier fluid in the range of from about 5% to about 75% by volume of carrier fluid.

* * * * *